United States Patent [19]

Fukasawa et al.

[11] Patent Number: 4,781,889

[45] Date of Patent: Nov. 1, 1988

[54] HOLLOW FIBER MEMBRANE TYPE ARTIFICIAL LUNG

[75] Inventors: Hiromichi Fukasawa, Funabashi; Yoshiro Katsura, Narashino; Kazuhiko Hagiwara, Tokyo, all of Japan

[73] Assignee: Terumo Kabushiki Kaisha, Tokyo, Japan

[21] Appl. No.: 81,536

[22] Filed: Aug. 3, 1987

Related U.S. Application Data

[63] Continuation of Ser. No. 597,440, Apr. 6, 1984, abandoned.

[30] Foreign Application Priority Data

May 27, 1983 [JP] Japan .................. 58-92325

[51] Int. Cl.$^4$ .............................................. A61M 1/14
[52] U.S. Cl. .............................. 422/48; 128/DIG. 3; 261/DIG. 28; 261/122; 210/321.8; 210/321.3; 210/321.4
[58] Field of Search .................. 422/48; 261/DIG. 28, 261/122; 128/DIG. 3; 210/321.3, 321.4

[56] References Cited

U.S. PATENT DOCUMENTS

| | | | |
|---|---|---|---|
| 3,520,416 | 2/1968 | Keedwell | 210/490 |
| 4,179,380 | 12/1979 | Amicel et al. | 422/48 X |
| 4,212,744 | 7/1980 | Oota | 210/321 |
| 4,239,729 | 12/1980 | Hasegawa et al. | 422/48 |
| 4,319,996 | 3/1982 | Vincent et al. | 210/188 |
| 4,374,802 | 2/1983 | Fukasawa | 422/48 |

FOREIGN PATENT DOCUMENTS

| | | |
|---|---|---|
| 0005866 | 12/1979 | European Pat. Off. |
| 0048943 | 4/1982 | European Pat. Off. |
| 3106188 | 8/1982 | Fed. Rep. of Germany |

OTHER PUBLICATIONS

Rompps Chemisches Worterbuch, "Silicone", pp. 804–806 (1969) and partial English language translation.
Murphy et al., "Laboratory and Clinical Experience with a Microporous Membrane Oxygenator", Trans. Am. Soc. Artif. Organs, vol. XX, 1974, pp. 278–283.
Akamatsu, Kiyoshi et al., Chemical Abstracts, Jun. 27, 1979, vol. 91, p. No. 43, No. 141845v.
S. Sifniades et al., Hydrometallurgy, Jan. 15, 1981, pp. 201–202, "Recovery of Uranium from Phosphoric Acid by means of Supported Liquid Membranes".

Primary Examiner—Barry S. Richman
Assistant Examiner—Lynn M. Kummert
Attorney, Agent, or Firm—Frishauf, Holtz, Goodman & Woodward

[57] ABSTRACT

A hollow fiber membrane type artificial lung and a method for the manufacture thereof. The artificial lung comprises a housing, a hollow fiber bundle positioned in the housing and formed of a multiplicity of gas-exchange hollow fiber membranes, a first fluid chamber defined by the external surfaces of the hollow fiber membranes and the internal surface of the housing, a first fluid inlet and a first fluid outlet both communicating with the first fluid chamber, partitions supporting in place the opposite ends of the hollow fibers and provided at the inner face of the housing, and a second fluid inlet and a second fluid outlet allowed to communicate with the empty spaces inside the hollow fiber membranes, which artificial lung is characterized by the fact that the hollow fiber membranes are produced by causing porous hollow fiber substrates which have through micropores distributed in the walls thereof to be treated with silicone oil so that the silicone oil will block up said micropores without forming a silicone oil layer on the internal surfaces of the walls of the porous hollow fiber substrates.

15 Claims, 2 Drawing Sheets

FIG. 1
FIG. 2
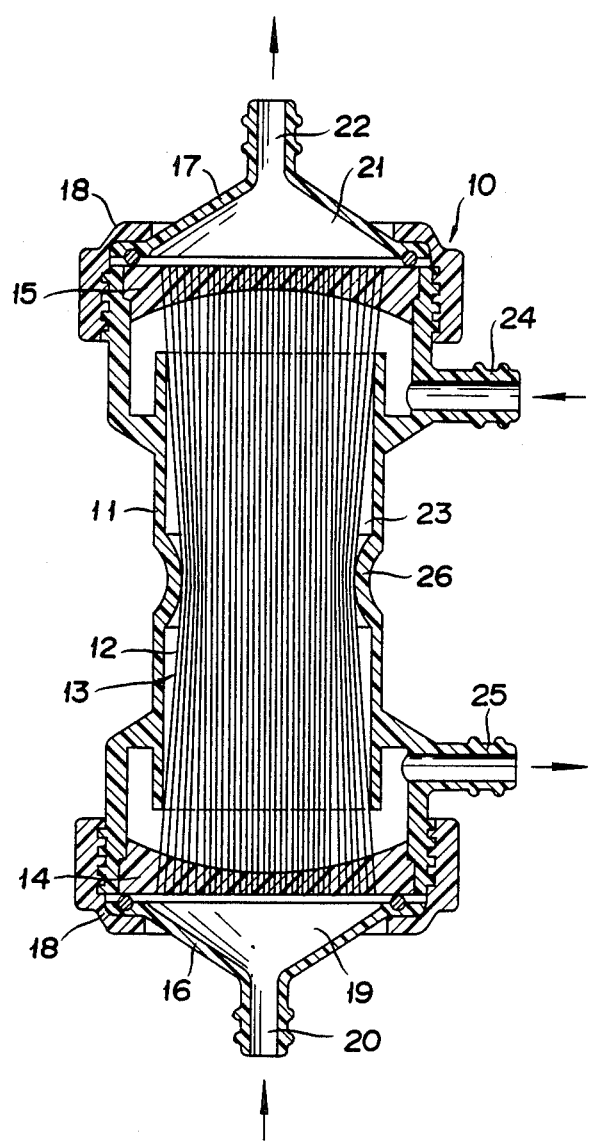
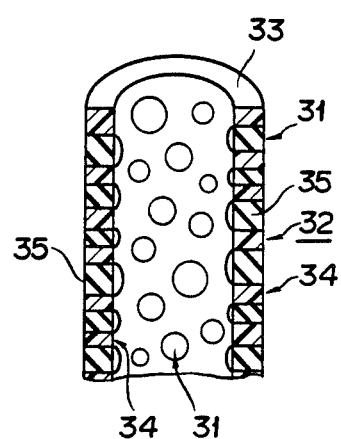

HOLLOW FIBER MEMBRANE TYPE ARTIFICIAL LUNG

This application is a continuation of application Ser. No. 597,440, filed Apr. 6, 1984, now abandoned.

BACKGROUND OF THE INVENTION

1. Field of the Invention

This invention relates to a hollow fiber membrane type artificial lung and a method for the manufacture thereof. More particularly, this invention relates to a hollow fiber membrane type artificial lung enjoying high permeability to gas, low cost and long service life, and to a method for the manufacture thereof.

2. Description of Prior Arts

Generally during the course of surgical operation of the heart, a hollow fiber membrane type artificial lung is used incorporated in an external circulatory path for the purpose of leading blood haing a depleted oxygen supply out of the patient's circulatory system and oxygenating the blood. For use in artificial lungs of this class, two types of hollow fibers are available; homogeneous membrane type and porous membrane type. With the homogeneous membrane, passage of a gas through the membrane is effected by the molecules of the gas being dissolved and dispersed in the membrane. Polydimethyl siloxane rubber is a typical material for the homogeneous membrane. A Colobeau membrane type lung making use of this particular material has already been commercialized. In terms of the permeability to gas, however, silicone is the only material that has been demonstrated to be usable for the homogeneous membrane. Because of its strength, however, the silicone membrane cannot be obtained in any smaller thickness than 100 μm. Because of this reason, the permeability of the silicone membrane to gas has its limit. This membrane shows poor permeability particularly to carbon dioxide gas. Silicone as a material has another disadvantage in that it is expensive and is deficient in processibility.

In contrast, the porous membrane permits a gas to flow in bulk through the micropores distributed therein because these micropores are very large as compared with the molecules of the gas being passed. Various types of artificial lungs using porous membranes such as microporous polypropylene membrane, for example, have been proposed. Since the porous membrane has high permeability to steam, there is a possibility that the moisture permeating the micropores will condense to form water and impair the performance of the membrane. When the porous membrane is used for circulation of blood over a protracted period, it at times suffers from the disadvantage that of blood plasma occurs.

To eliminate the various drawbacks suffered by the conventional porous membrane as described above, there has been proposed a hollow fiber which has a thin gas-impervious film of methylhydrogen polysiloxane formed on the wall of a hollow fiber substrate containing in the wall thereof through micropores not exceeding 10 microns in diameter (Japanese Patent Publication SHO 54(1979)-17,052). In this hollow fiber, the coating of methylhydrogen polysiloxane is formed not merely inside the micropores distributed in the hollow fiber substrate but also on the internal and external surfaces of the wall of the hollow fiber substrate. Since the inside diameter of the hollow fiber substrate is decreased by the thickness of coating thus formed on the internal surface, the exchange capacity of the hollow fiber is proportionately lowered. By the same token, the amount (the thickness of coating) of methylhydrogen polysiloxane to fill the micropores is proportionately increased. As the result, the overall permeability of the hollow fiber to gases such as oxygen and carbon dioxide gas is lowered. This hollow fiber can be used advantageously in aqualungs. When it is used in an artificial lung for a protracted period, however, it will eventually suffer from leakage of blood plasma.

OBJECT OF THE INVENTION

An object of this invention, therefore, is to provide a novel hollow fiber membrane type artificial lung and a method for the manufacture thereof.

Another object of this invention is to provide a hollow fiber membrane type artificial lung enjoying high permeability to gas, low cost, and long service life and a method for the manufacture thereof.

SUMMARY OF THE INVENTION

The objects described above are accomplished by this invention providing a hollow fiber membrane type artificial lung comprising a housing, a hollow fiber bundle inserted through the housing and formed of a multiplicity of gas-exchange hollow fiber membranes, a first fluid chamber defined by the external surfaces of the hollow fiber membranes and the internal surface of the housing, first fluid inlet and outlet communicating with the first fluid chamber, partitions supporting in place the opposite ends of the hollow fiber membranes and provided at the inner face of the housing, and second fluid inlet and outlet allowed to communicate with the empty spaces inside the aforementioned hollow fiber membranes, which artificial lung is characterized by the fact that the aforementioned hollow fibers are produced by causing porous hollow fiber substrates which have through micropores distributed in the walls thereof to be treated with silicone oil so that the silicone oil will block up the micropores substantially without forming a silicone oil layer on the internal surfaces of the walls of the porous hollow fiber substrates.

This invention embraces a hollow fiber membrane type artificial lung using porous hollow fiber substrates measuring 100 to 1000 μm in inside diameter and 5 to 80 μm in wall thickness and containing micropores 5 Å to 500 μm in diameter. This invention also embraces a hollow fiber membrane type artificial lung, wherein the first fluid is oxygen gas, the second fluid is blood, flow volume of blood is 1 l/min. per/m$^2$ of the hollow fiber membrane area and volume of carbon dioxide to be moved is at least 40 ml/min. per 1 m$^2$ of the hollow fiber membrane area when the flow amount of oxygen gas is 3 l/min. per 1 m$^2$ of the hollow fiber membrane, and there is no leakage of blood plasma when the blood is cycled in the hollow fiber membrane for within 12 hours. This invention also embraces a hollow fiber membrane type artificial lung using a porous hollow fiber substrates having a porosity in the range of 20 to 80%. This invention further embraces a hollow fiber membrane type artificial lung which uses dimethyl or methylphenyl silicone as the silicone oil. Further this invention embraces a hollow fiber membrane type artificial lung which uses the silicone oil of a grade having a viscosity of 20 to 100,000 mPa.s.

The aforementioned objects are further accomplished by this invention providing a method for the manufacture of a hollow fiber membrane type artificial lung, characterized by assembling the modules of an artificial lung comprising a housing, a hollow fiber bundle positioned in the housing and formed of a multiplicity of gas-exchange hollow fiber membranes, a first fluid chamber defined by the external surface of the hollow fiber membranes and the internal surface of the housing, first fluid inlet and outlet communicating with the first fluid chamber, partitions supporting in place the opposite ends of the hollow fiber membranes and provided at the inner face of the housing, and second fluid inlet and outlet allowed to communicate with the empty spaces inside the aformentioned hollow fiber membranes, allowing a solution of silicone oil to flow into the assembled artificial lung with either the inlet or the outlet closed thereby causing the hollow fibers to be impregnated with the silicone oil, then substantially removing the silicone oil from the interior of the hollow fiber, and passing a mixture of a solvent and a non-solvent through the interior of the artificial lung.

This invention embraces a method for the manufacture of a hollow fiber membrane type artificial lung, wherein the mixture of a solvent and a non-solvent contains the solvent in a concentration in the rane of 5 to 40% by weight. This invention further embraces a method for the manufacture of a hollow fiber membrane type artificial lung, wherein the solvent in the mixture is trifluorotrichloroethane and the non-solvent is an alcohol.

BRIEF DESCRIPTION OF THE DRAWINGS

FIG. 1 is a longitudinal cross section illustrating a typical hollow fiber type artificial lung according to this invention, FIG. 2 is an enlarged model diagram of a hollow fiber to be used in the artificial lung of the present invention.

PREFERRED EMBODIMENT OF THE INVENTION

Figure 3:
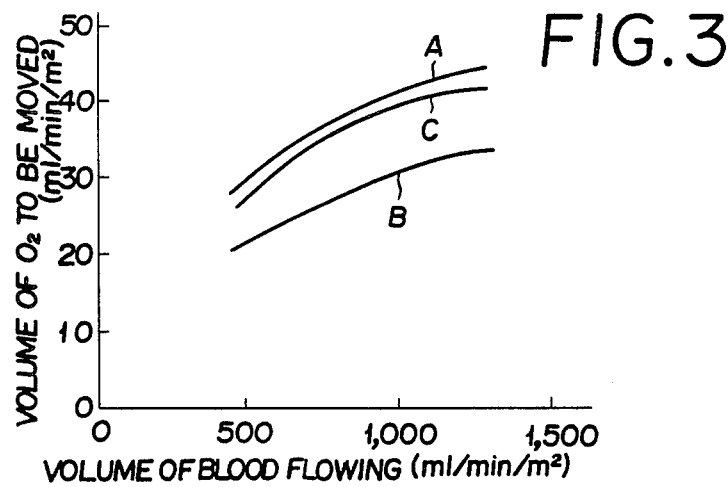
FIG. 3 is a graph showing the relation between the volume of blood flowing through the artificial lung and the volume of oxygen to be moved.

Now, one embodiment of this invention will be described below with reference to the accompanying drawings. As illustrated in FIG. 1, the artificial lung contemplated by this invention has a cylindrical housing 11 substantially forming the shell of an artificial lung 10 and a fiber bundle 13 of hollow fiber membranes 12 accommodated within the hollow space of the cylindrical housing 11. The opposite ends of the hollow fiber membranes 12 are retained fast in a watertight state within the housing 11 through the medium of partitions 14, 15. To the opposite ends of the housing 11, headers 16, 17 are held fast with covers 18 which are helically fastened to the housing 11. The internal surface of the header 16 and the partition 14 define a blood inlet chamber 19 serving as a first fluid inlet chamber communicating with the empty spaces within the hollow fiber membranes 12. In the header 16 is formed a blood inlet 20 serving as a first fluid inlet. The internal surface of the header 17 and the diaphragm partition 15 define a blood outlet chamber 21 serving as a first fluid outlet chamber communicating with the hollow fiber membranes. In the header 17 is formed a blood outlet 22 serving as a first fluid outlet. The partitions 14, 15, the internal surface of the housing 11, and the external surfaces of the hollow fibers define a gas chamber 23 serving as a second fluid chamber. At the opposite ends of the housing 11 are formed a gas inlet 24 serving as a second fluid inlet and a gas outlet 25 serving as a second fluid outlet, both communicating with the gas chamber 23. Halfway along the entire length of the internal surface of the housing 11, there is formed an annular constriction 26 serving to decrease radially the overall diameter of the fiber bundle 13. As a result, the fiber bundle is drawn in to form a constricted part at the center in the axial direction as shown in FIG. 2. The packing ratio of the hollow fibers 12, therefore, is varied along the axial direction of the fiber bundle and increased to a maximum at the center relative to the length of the fiber bundle. The desirable packing ratio of hollow fibers is in the range of about 60 to 80% at various portions of the artificial lung and in the range of about 30 to 60% within the housing. At the extreme ends of the fiber bundle 13, namely outside the partitions 14, 15, the packing ratio of hollow fibers falls in the range of about 20 to 40%.

The partitions 14, 15 fulfill an important function of isolating the interiors of the hollow fiber membranes 12 from the surrounding environment. Generally, these partitions 14, 15 are produced by casting a high molecular weight potting agent of high polarity such as, for example, polyurethane, silicone or epoxy resin on the wall surface at the extreme ends of the housing 11 by virtue of centrifugal force and then allowing the case potting agent to cure. To be more specific, a multiplicity of hollow fiber membranes 12 of a length amply exceeding the length of the housing are prepared and, with their open ends stoppered with resin of high viscosity, arranged as laid across the interior of the housing 11. After that, the opposite overall ends of the fiber bundle are each completely wrapped with covers 18. The housing 11 is then set rotating about the axis thereof and, while the housing 11 is thus in rotation, the high-molecular weight potting agent is cast into the housing 11 through the opposite ends and allowed to cure. After the potting agent has been fully cured, the covers are removed and the outer surfaces of cured masses of potting agent are cut out with a sharp blade to expose the opposite overall ends of the hollow fiber bundle 13.

Each of the hollow fibers which are used in the artificial lung as described above is a hollow fiber type gas-exchange membrane obtained by causing a porous hollow fiber substrate 33, which has through micropores 31 distributed in the wall 32 thereof, as illustrated in FIG. 2, to be treated with silicone oil so that the silicone oil will fill up the micropores 31 in the wall 32 substantially without forming any silicone oil layer on the internal surface 34 of the wall 32. The terms "substantially without forming" means preferably there is no silicone oil layer and even if one is present, the silicone oil layer is at most 20 A thick.

Examples of the material for the porous hollow fiber substrate to be used in producing the hollow fiber are polypropylene, polyethylene, polytetrafluoroethylene, polysulfone, polyacrylonitrile, polyethylene terephthalate, polybutylene terephthalate, polycarbonate, polyurethane, nylon-6,6, nylon-6 and cellulose acetate. Among other materials, polyolefins are particularly desirable. Polypropylene is the best choice.

In order that the artificial lung using the gas-exchange membrane formed of such hollow fiber substrates may acquire a capacity enough to fulfill the expected function perfectly, the wall thickness and the porosity of the membrane have their own limits as described fully afterward. Generally, the volume q of a given gas to permeate through a membrane is expressed by the following formula.

$$q = P \times \Delta p \times A / l$$

wherein P stands for permeation coefficient of the gas, $\Delta p$ for pressure differential of the gas permeating through the membrane, A for surface area of the membrane and l for thickness of the membrane. In the membrane contemplated by this invention, the proportion of the silicone oil portions (actual area) permeable to the gas on the entire surface of the membrane is considered, as is plain from FIG. 1, to equal the porosity of the membrane on the assumption that the micropores in the membrane are straight. To make up for possible decrease in the actual area for the permeation of the gas and ensure that sufficient volume q of the gas will be passed, therefore, the thickness l of the membrane must be decreased. By this reason, this invention defines the thickness of the wall of the hollow fiber substrate in the range of 5 to 80 μm, preferably 10 to 30 μm, and the porosity of the membrane in the range of 20 to 80%, preferably 40 to 80%. It further defines the inside diameter of the hollow fiber substrate in the range of 100 to 1000 μm, preferably 100 to 300 μm and the diameter of the through micropores distributed in the wall thereof in the range of 100 Å to 5 μm, preferably 100 Å to 1 μm.

The artificial lung of this invention is produced by first incorporating the aforementioned porous hollow fiber substrates in the modules of the artificial lung, then passing a solution of silicone oil through the substrates and enabling the silicone oil to impregnate the substrates amply, subsequently passing a gas through the substrates, and finally causing a mixture of a solvent and a non-solvent to flow through at least the interiors of the hollow fiber substrates.

Examples of the silicone oil usable advantageously in this invention include dimethyl silicone oil, methylphenyl silicone oil, methylchlorophenyl silicone oil, branched dimethyl silicone oil and methyl hydrogen silicone oil. Among other silicone oils, dimethyl silicone oil and methylphenyl silicone oil are particularly desirable. Dimethyl silicone oil is the best choice.

This silicone oil is used in the form of a solution containing the silicone oil in a concentration of 20 to 80% by weight, preferably 30 to 60% by weight. Examples of the solvent to be used for this solution include benzene, toluene, xylene, hexane, dichloromethane, methylethyl ketone, methyl ether, ethyl acetate, and chlorofluorinated hydrocarbons such as, for example, trifluorotrichloroethane (Freon). The liquid to be used for removing the silicone oil adhering to the surface of the walls of the hollow fiber substrates must be a mixture of the aforementioned solvent with a solvent incapable of dissolving silicone (alcohol). This is because the aforementioned solvent, if used alone, will dissolve out silicone. Examples of this mixture include a mixture of hexane with ethanol, a mixture of hexane with isopropyl alcohol, a mixture of xylene with ethanol, a mixture of toluene with isopropyl alcohol, and mixtures of chlorofluorinated hydrocarbons with alcohols (such as, for example, a mixture of Freon with ethanol). In the mixture of the aforementioned solvent with the non-solvent, the concentration of the solvent is in the range of 5 to 40% by weight. If the concentration of the solvent is less than 5% by weight, then the mixture may possibly fail to effect thorough removal of the silicone oil adhering to the internal surfaces of the hollow fiber substrates. If this concentration exceeds 40% by weight, then the mixture may possibly remove the silicone oil from the micropores and prevent the silicone oil keeping the micropores completely closed. Thus, the concentration of the solvent in the mixture is preferred to fall in the range of 10 to 30% by weight, though variable with the particular combination of the solvent and the non-solvent to be used. Particularly, in the case of a mixture of a chlorofluorinated hydrocarbon with an alcohol, this concentration is desired to fall in the range of 15 to 25% by weight. The viscosity of the silicone oil is in the range of 20 to 100,000 mPa.s., preferably 50 to 3000 mPa.s.

The artificial lung constructed as described above is incorporated in an external circulatory path for blood. Thus, it is put to use as installed outside the patient's own circulatory system. To be specific, the blood is introduced by a blood pump (not shown) through the blood inlet 20, forwarded through the blood inlet chamber 19, and passed through the individual hollow fiber membranes 12. While the blood is being sent through the hollow fibers, it is oxygenated with the oxygen flowing through the gas inlet 24 into the gas chamber 23 and made to release carbon dioxide gas. The oxygenated blood is brought to the blood outlet chamber 21 and released from the artificial lung via the blood outlet 22. In the meantime, the oxygen remaining after the oxygenation of blood is discharged from the artificial lung in conjunction with carbon dioxide gas via the gas outlet 25.

Now, the present invention will be more specifically described below with reference to working examples.

EXAMPLE 1

Hollow fiber substrates of polypropylene formed by being drawn in the axial direction in the form of tubes measuring 200 μm in inside diameter and 25 μm in wall thickness and having through micropores of an average diameter of 700 Å distributed in the walls thereof (porosity 50%) were immersed in a solution of 50% by weight of dimethyl polysiloxane in Freon for three minutes. Air was passed through the hollow fiber substrates and an aqueous 20% Freon/ethanol solution was passed both inside and outside the hollow fiber substrates. Consequently, there were obtained hollow fibers having the micropores filled up with dimethyl silicone oil. An artificial lung constructed as shown in FIG. 1 was produced by using these hollow fibers (having a total membrane surface of 1 m²) (hereinafter called "Module A").

Figure 4:
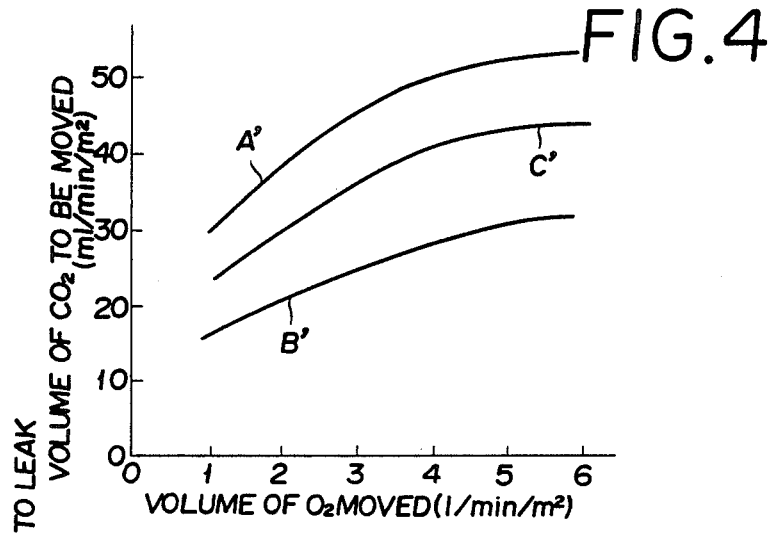
FIG. 4 is a graph showing the relation between the volume of oxygen moved and the volume of carbon dioxide gas to be moved.

This artificial lung was tested for performance by preparing venous blood having an oxygen saturation of 65% and a partial carbon dioxide gas pressure of 45 mmHg from fresh heparinized bovine blood and passing this venous blood through the artificial lung under test (Module A). The hemoglobin content of this blood was 12 g/dl and the temperature of the blood was 37° C. When the flow volume of oxygen was fixed at 1 liter/min./m², the relation between the flow volume $Q_B$ of the blood and the volume of oxygen moved was as indicated by the curve A in the graph of FIG. 3. When the flow volume of blood was fixed at 1000 ml/min./m², the relation between the flow volume of oxygen and that of carbon dioxide gas was as indicated by the curve A' in the graph of FIG. 4, and when the flow volume of oxygen was 3 l/m², the volume of the carbon dioxide to be moved was at most 40 ml/min./m².

Control 1

An artificial lung (having a total membrane surface of 1 m²) was produced by following the procedure of Example 1, except that the cleaning of the hollow fiber substrates with the 20% Freon/ethanol solution was omitted (hereinafter called "Module B").

This artificial lung was subjected to the same test as in Example 1. The results were as indicated by the curve B in the graph of FIG. 3 and the curve B' in the graph of FIG. 4.

Control 2

An artificial lung (having a total membrane surface of 1 m²) was produced in a construction as illustrated in FIG. 1 by using hollow fibers of dimethyl polysiloxane measuring 200 μm in inside diameter and 100 μm in wall thickness (hereinafter called "Module C").

This artificial lung was subjected to the same test as in Example 1. The results were as indicated by the curve C in the graph of FIG. 3 and the curve C' in the graph of FIG. 4.

EXAMPLE 2

Figure 5:
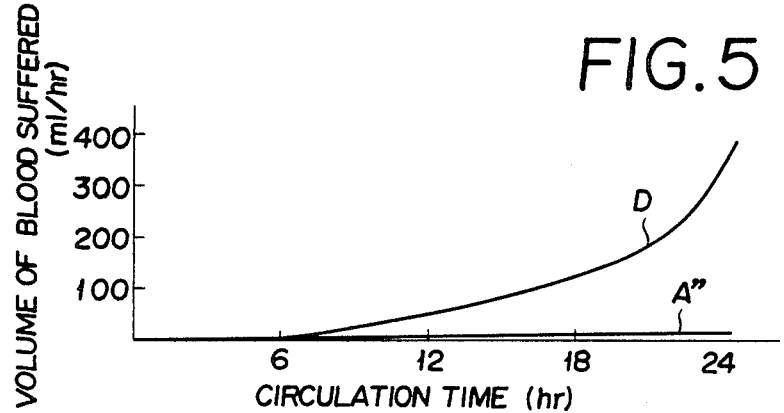
FIG. 5 is a graph showing the relation between the length of time of the partial external circulation of blood from the venous-arterial system and the volume of blood which leaked.

The artificial lung produced in Example (Module A) was tested for partial external venous-arterial blood circulation using mongrel dogs. The relation between the length of time of circulation and the volume of blood plasma suffered to leak was as indicated by the curve A in the graph of FIG. 5.

Separately, hollow fibers were produced by following the procedure of Example 1, except that a solution of 2% methyl hydrogen polysiloxane in gasoline was used in place of the dimethyl polysiloxane solution. An artificial lung (having a total membrane surface of 1 m²) was produced in a construction as illustrated in FIG. 1 by using the hollow fibers (hereinafter called "Module D"). This artificial lung was subjected to the same test as in Example 1. The results were as indicated by the curve D in the graph of FIG. 5.

In the test described above, absolutely no leakage of blood plasma was observed within 12 hours or more and water formed in a ratio of 2 to 3 ml/hr in Module A. In Module D, blood plasma began to leak at the 7th hour of the circulation and the volume of leakage increased exponentially thereafter and reached 400 ml/hr at the 24th hour of circulation.

As described above, the hollow fiber membrane type artificial lung of the present invention comprises a housing, a hollow fiber bundle provided in the housing and formed of a multiplicity of gas-exchange hollow fibers, a first fluid chamber defined by the external surfaces of the hollow fiber membranes and the internal surface of the housing, first fluid inlet and outlet communicating with the first fluid chamber, partitions supporting in place the opposite ends of the hollow fiber membranes and provided at the inner face of the housing, and a second fluid inlet and outlet allowed to communicate with the empty spaces inside the aforementioned hollow fiber membranes, which artificial lung is characterized by the fact that the aforementioned hollow fiber membranes are produced by causing porous hollow fiber substrates which have through micropores distributed in the walls thereof to be treated with silicone oil so that the silicone oil will block up the micropores substantially without forming a silicone oil layer on the internal surfaces of the walls of the porous hollow fiber substrates. Therefore, porous hollow fiber membranes of high strength can be used as substrates. Thus, the artificial lung of this invention is notably improved in strength over the conventional artificial lung using silicone membrane. Further, the hollow fiber membranes in the artificial lung of this invention permit higher dispersion and permeation of gas than the conventional hollow fiber membranes of silicone which have to date had the highest permeation of gas. Moreover, the artificial lung of this invention has less possibility of undergoing degradation of performance due to formation of dews because the hollow fiber membranes have lower permeability to steam. Further, the hollow fiber membranes of the artificial lung of this invention are perfectly free from the leakage of crystals due to protracted blood circulation which has constituted one salient drawback of the conventional porous hollow fibers.

The porous hollow fiber substrates which are used in the present invention have an inside diameter in the range of 100 to 1000 μm and a wall thickness in the range of 5 to 80 μm and contain in their walls micropores having a diameter in the range of 100 Å to 5 μm, their permeability to such gases as oxygen and carbon dioxide gas is notably increased when the silicone oil is allowed to fill up only the micropores.

The permeability of the hollow fiber membranes to such gases is further enhanced by using dimethyl silicone oil or methylphenyl silicone oil, particularly the former of the two silicone oils mentioned, as the silicone oil serving to fill up the micropores. The artificial lung contemplated by the present invention, accordingly, is perfectly free from all the drawbacks suffered by the conventional artificial lung using hollow fibers of silicone and the conventional porous hollow fibers.

This invention further relates to a method for the manufacture of a hollow fiber membrane type artificial lung, which is characterized by assembling the modules of the artificial lung, allowing a solution of silicone oil to flow into the assembled artificial lung with either the inlet or outlet kept closed, thereby causing the hollow fiber membranes to be impregnated with the silicone oil, then removing the silicone oil from the interiors of the hollow fibers, and passing a mixture of a solvent and a non-solvent through the interior of the artificial lung. Thus, in the artificial lung obtained by this invention, the silicone oil fills up the micropores distributed in the porous walls of the hollow fiber substrate without forming a silicone oil layer on the internal surfaces of the walls of the hollow fiber substrates. Hence, the outstanding effects described above.

What is claimed is:

1. A hollow fiber membrane type artificial lung comprising:
   a housing;
   a hollow fiber bundle positioned in said housing and comprising a multiplicity of gas-exchange hollow fiber membranes;
   a first fluid chamber defined by the external surfaces of said hollow fiber membranes and the internal surface of said housing;
   a first fluid inlet and a first fluid outlet both communicating with said first fluid chamber;

partitions supporting in place opposite ends of said hollow fiber membranes and provided at an inner face of said housing; and a second fluid inlet and a second fluid outlet communicating with empty spaces inside said hollow fiber membranes;

said hollow fiber membranes comprising porous hollow fiber substrates which have been impregnated with silicone oil and have through micropores distributed in the walls thereof;

said porous hollow fiber substrates being hollow fiber membranes having an inside diameter in the range of 100 to 1000 μm, a wall thickness in the range of 5 to 100 μm, a porosity in the range of 40 to 80% and containing in the walls thereof said micropores of a diameter in the range of 100 Å to 5 μm; and said silicone oil having a viscosity in the range of 50 to 3000 mPa.s, said silicone oil blocking said micropores and said hollow fiber substrates being free of a silicone oil layer on the internal and external surfaces of the walls thereof.

2. The hollow fiber membrane type artificial lung according to claim 1, wherein said first fluid inlet is coupled to a source of oxygen gas, said second fluid inlet is coupled to a source of blood, said hollow fiber bundle being adapted to pass blood therethrough with a flow volume of blood of 1 l/min. per 1 m² of the hollow fiber membrane area and a flow volume of carbon dioxide of at least 40 ml/min. per 1 m² of the hollow fiber membrane area when the flow amount of oxygen gas is 3 l/min. per 1 m² of the hollow fiber membrane, whereby there is no leakage of blood plasma when the blood is cycled in the hollow fiber membrane for a period of up to 12 hours.

3. The hollow fiber membrane type artificial lung according to claim 1, wherein said silicone oil is selected from the group consisting of dimethyl silicone oil, methylphenyl silicone oil, methylchlorophenyl silicone oil, branched dimethyl silicone oil and methyl hydrogen silicone oil.

4. The hollow fiber membrane type artificial lung according to claim 1, wherein said porous hollow fiber substrates are made of a polyolefin.

5. The hollow fiber membrane type artificial lung according to claim 4, wherein said polyolefin is polypropylene.

6. The hollow fiber membrane type artificial lung according to claim 1, wherein said hollow fiber membranes have an inside diameter in the range of 100 to 300 μm and a wall thickness in the range of 5 Å to 80 μm and containing in the walls thereof micropores having a diameter in the range of 100 Å to 1 μm.

7. The hollow fiber membrane type artificial lung according to claim 6, wherein said silicone oil is dimethyl silicone oil or methylphenyl silicone oil.

8. The hollow fiber membrane type artificial lung according to claim 6, wherein said porous hollow fiber substrates are made of a polyolefin.

9. The hollow fiber membrane type artificial lung according to claim 8 wherein said polyolefin is polypropylene.

10. The hollow fiber membrane type artificial lung according to claim 9, wherein said silicone oil is dimethyl silicone oil.

11. A hollow fiber membrane type artificial lung comprising:

a housing;

a hollow fiber bundle positioned in said housing and comprising a multiplicity of gas-exchange hollow fiber membranes;

a first fluid chamber defined by the external surfaces of said hollow fiber membranes and the internal surface of said housing;

a first fluid inlet and a first fluid outlet both communicating with said first fluid chamber;

partitions supporting in place opposite ends of said hollow fiber membranes and provided at an inner face of said housing; and a second fluid inlet and a second fluid outlet communicating with empty spaces inside said hollow fiber membranes;

said hollow fiber membranes being porous hollow fiber substrates which have through micropores distributed in the walls thereof, said micropores being closed with a silicone oil impregnated into said hollow fiber substrates to fill the micropores thereof, and being substantially removed from internal surfaces of said walls of said porous hollow fibers by flowing a mixture of a solvent for said silicone oil and a non-solvent for said silicone oil into said hollow fiber substrates whereby said internal and external wall surfaces are substantially free of silicone oil; and said porous hollow fiber substrates being hollow fiber membranes having an inside diameter in the range of 100 to 1000 μm, a wall thickness in the range of 5 to 80 μm, porosity in the range of 40 to 80% and containing in the walls thereof said micropores of a diameter in the range of 100 Å to 5 μm.

12. The hollow fiber membrane type artificial lung according to claim 11, wherein said silicone oil is selected from the group consisting of dimethyl silicone oil, methylphenyl silicone oil, methylchlorophenyl silicone oil, branched dimethyl silicone oil and methyl hydrogen silicone oil.

13. The hollow fiber membrane type artificial lung according to claim 12, wherein said porous hollow fiber substrates are made of a polyolefin.

14. The hollow fiber membrane type artificial lung according to claim 13, wherein said polyolefin is polypropylene.

15. The hollow fiber membrane type artificial lung according to claim 14, wherein said silicone oil is dimethyl silicone oil.

* * * * *